United States Patent
Kim et al.

(10) Patent No.: US 7,885,251 B2
(45) Date of Patent: Feb. 8, 2011

(54) REAL-TIME WIRELESS SENSOR NETWORK PROTOCOL HAVING LINEAR CONFIGURATION

(75) Inventors: Jae-Ho Kim, Yongin (KR); Sang-Shin Lee, Yongin (KR); Il-Yeup Ahn, Sungnam (KR); Kwang-Ho Won, Yongin (KR); Seong-Dong Kim, Sungnam (KR)

(73) Assignee: Korea Electronics Technology Institute (KR)

(*) Notice: Subject to any disclaimer, the term of this patent is extended or adjusted under 35 U.S.C. 154(b) by 1061 days.

(21) Appl. No.: 11/316,712

(22) Filed: Dec. 27, 2005

(65) Prior Publication Data

US 2007/0140303 A1 Jun. 21, 2007

(30) Foreign Application Priority Data

Dec. 21, 2005 (KR) .................. 10-2005-0126887

(51) Int. Cl.
*H04J 3/06* (2006.01)

(52) U.S. Cl. .................................. 370/350

(58) Field of Classification Search ........... 370/319, 370/321, 328, 337, 338, 347, 349, 350, 442, 370/503, 329; 455/13.2, 435.1, 459, 502, 455/433; 709/203, 251; 710/6
See application file for complete search history.

(56) References Cited

U.S. PATENT DOCUMENTS

| | | | | |
|---|---|---|---|---|
| 5,715,474 A | * | 2/1998 | Burke et al. | 710/6 |
| 5,802,321 A | * | 9/1998 | Buda et al. | 709/251 |
| 7,356,561 B2 | * | 4/2008 | Balachandran et al. | 709/203 |
| 2004/0018839 A1 | * | 1/2004 | Andric et al. | 455/433 |
| 2007/0076655 A1 | * | 4/2007 | Manjeshwar et al. | 370/329 |

* cited by examiner

*Primary Examiner*—Kevin C Harper
*Assistant Examiner*—Leon Andrews
(74) *Attorney, Agent, or Firm*—Edell, Shapiro & Finnan, LLC

(57) ABSTRACT

A network configuration method of a sensor network configured to collect sensed data from a plurality of sensor nodes comprising: arranging linearly a path of respective node so as to enable all sensor nodes except for a sink node and a terminal node to have respectively a predecessor and a successor; and setting the time synchronization of whole network by fixing the each node take its own time synchronization on the basis of an operation section of the predecessor.

16 Claims, 7 Drawing Sheets

[FIG. 1]
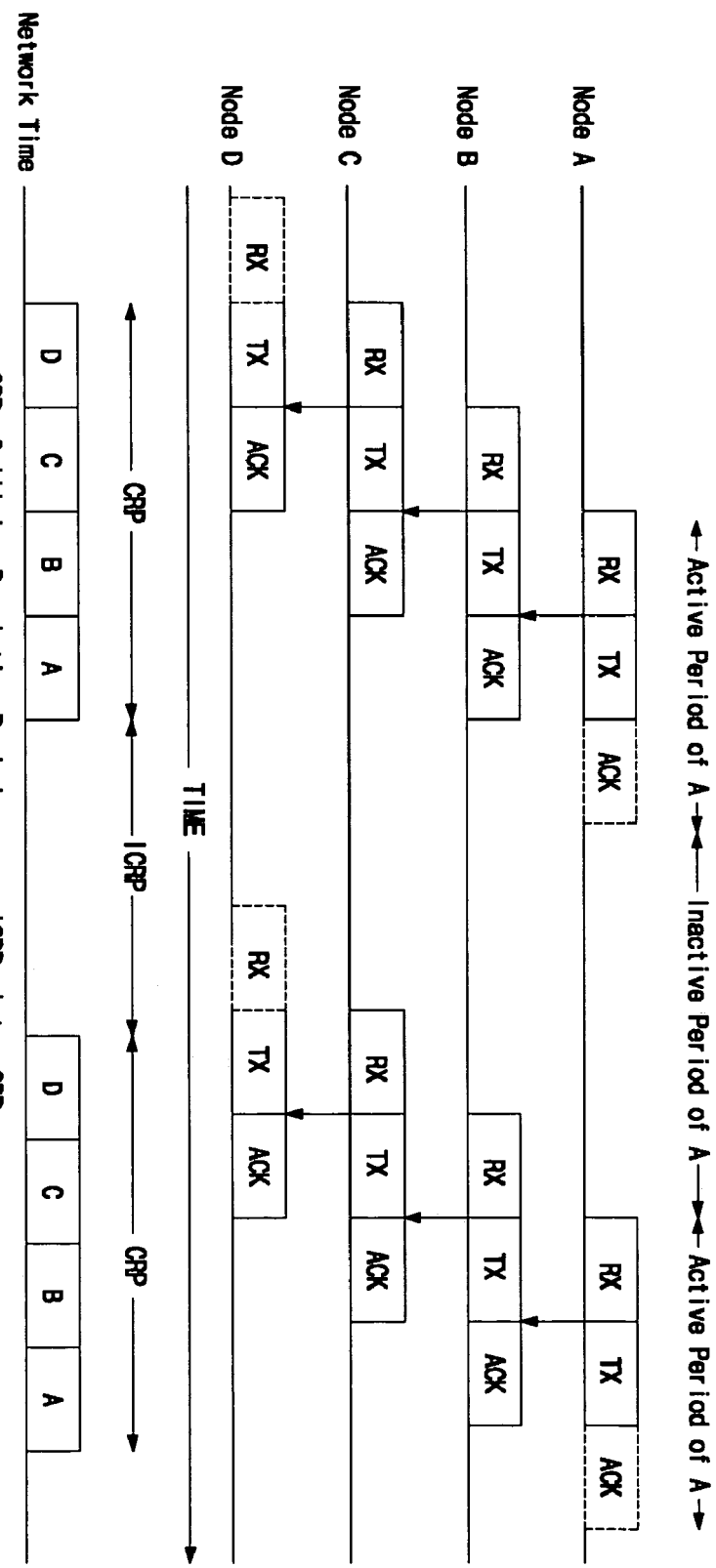

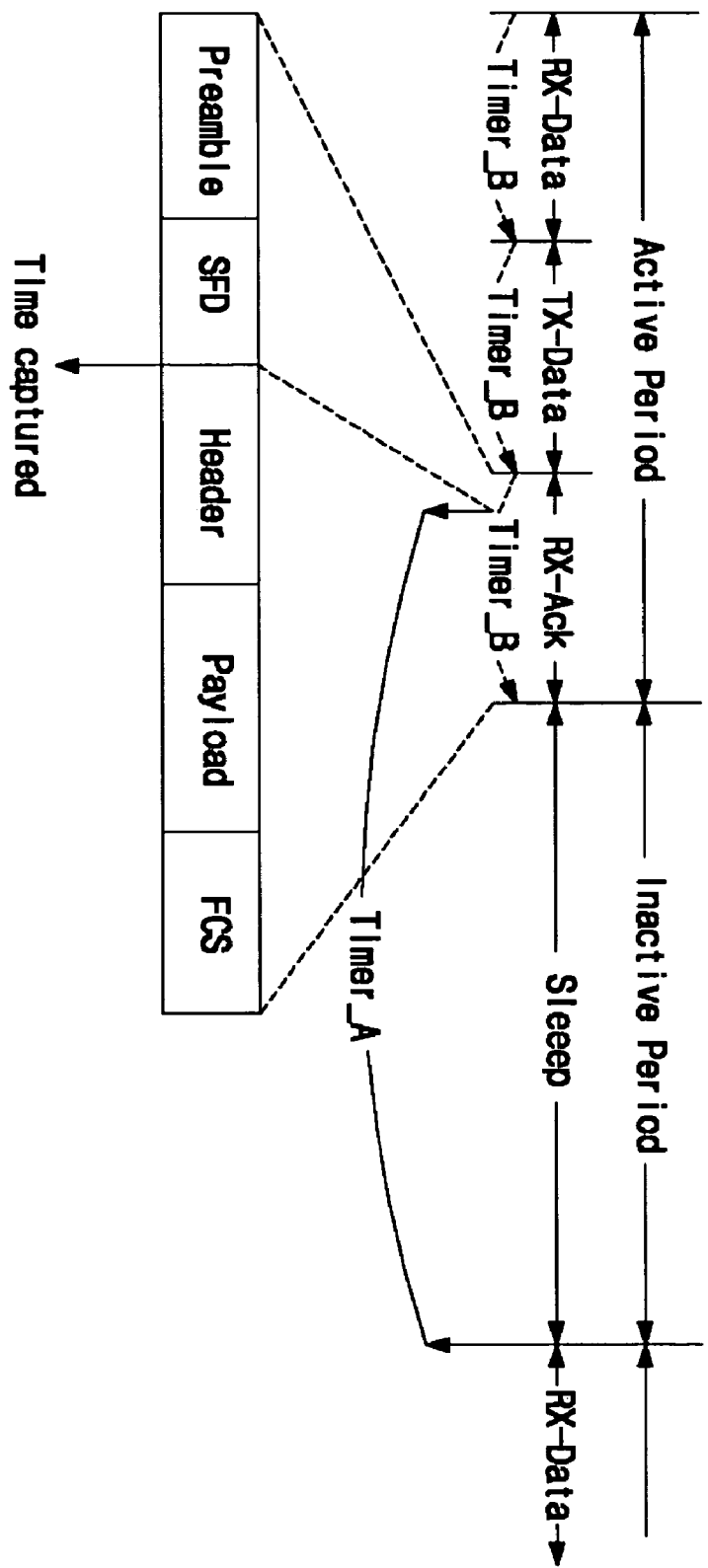
[FIG. 2]

[FIG. 3]
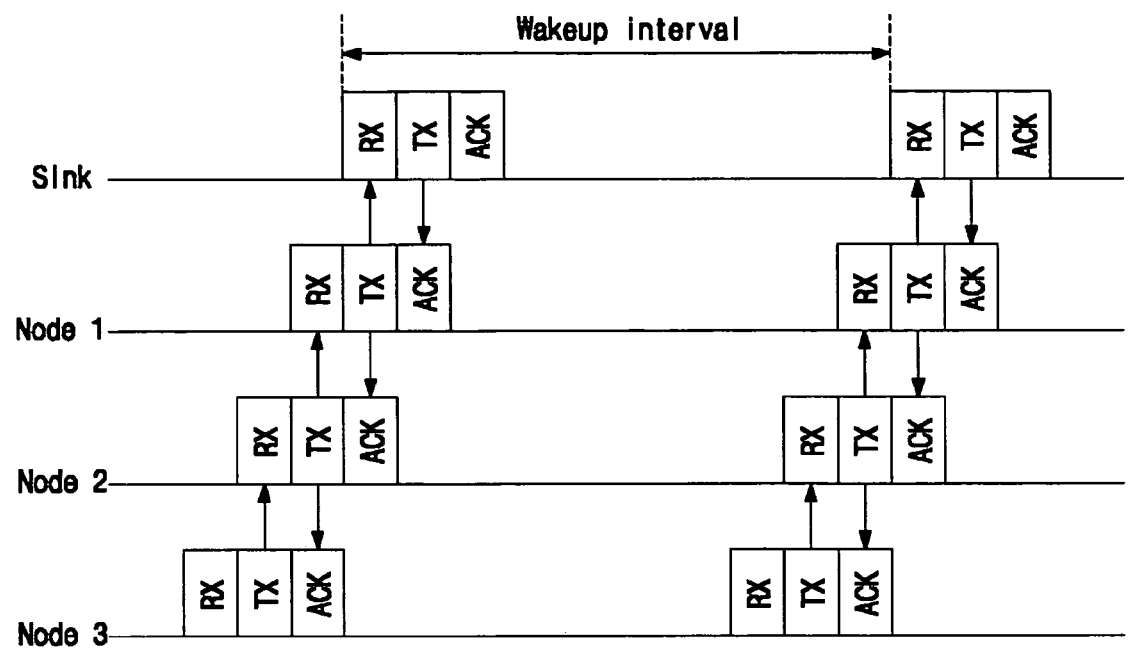

[FIG. 4]
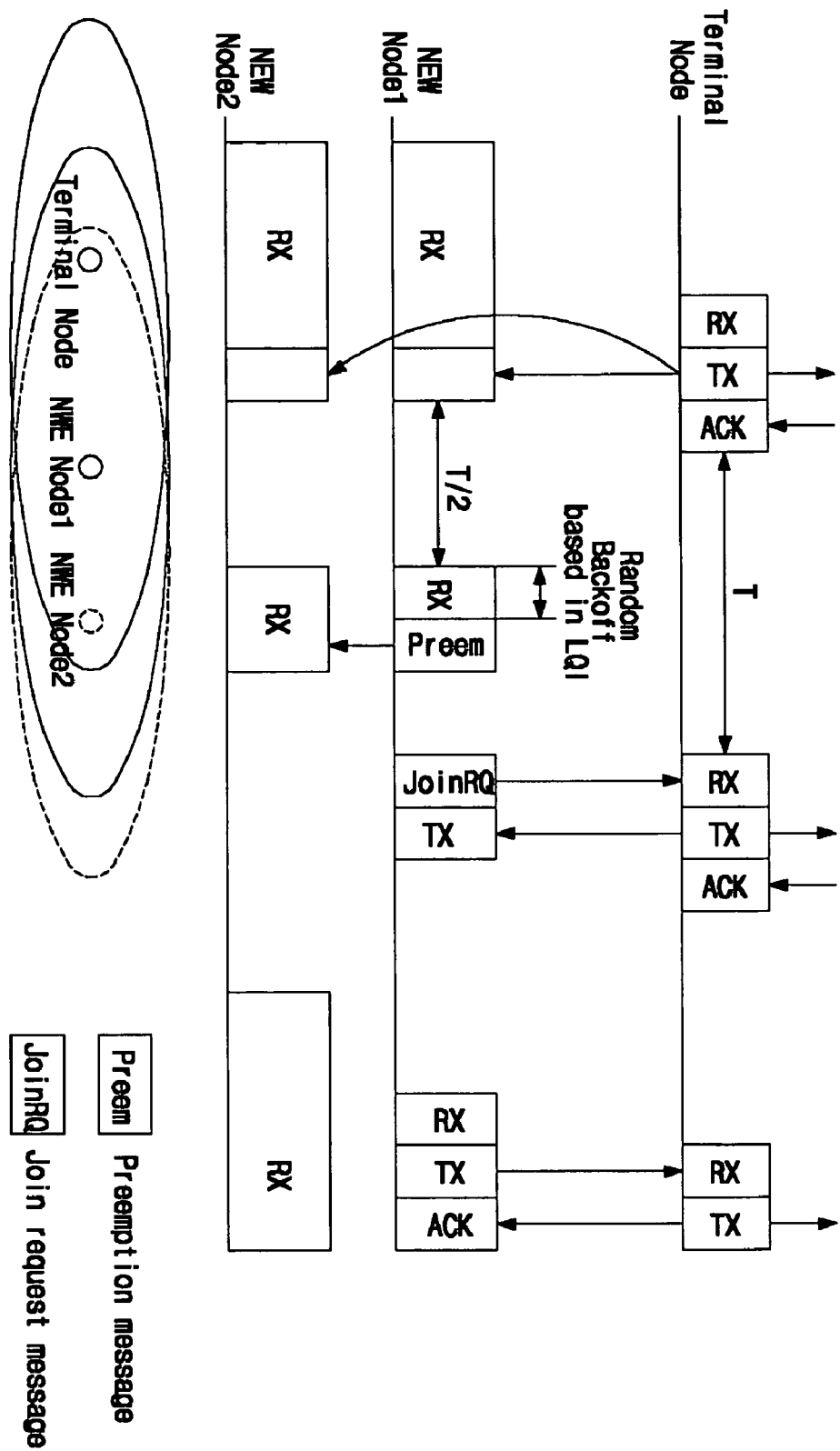

[FIG. 5]
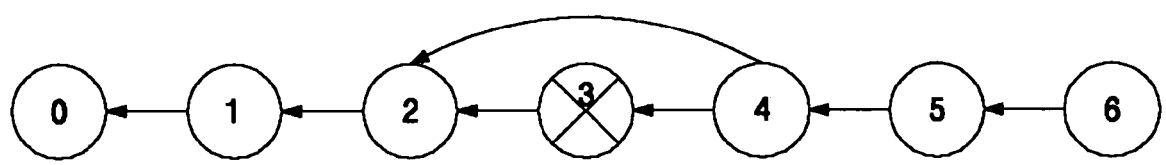

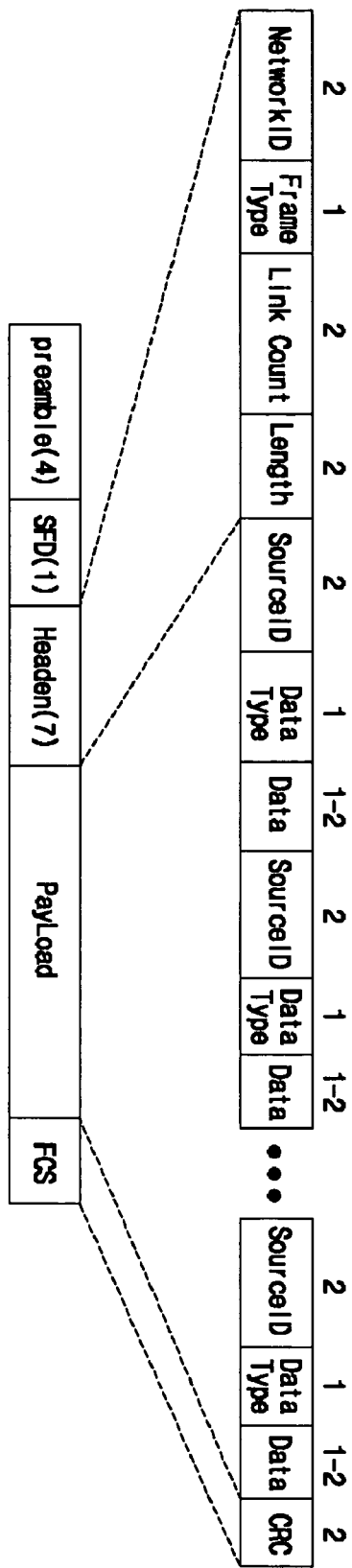
[FIG. 6]

[FIG. 7]
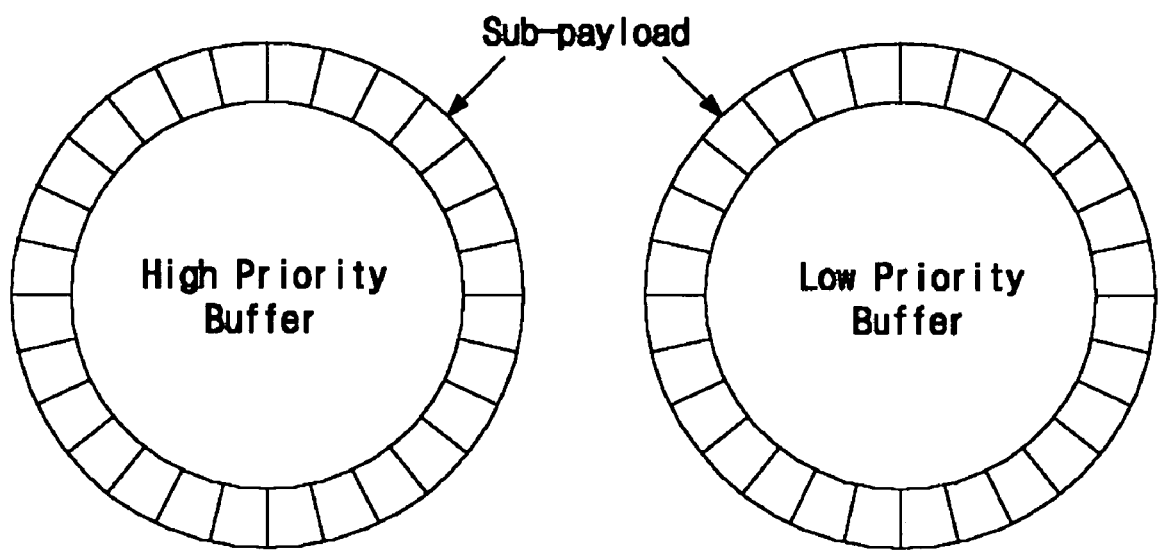

REAL-TIME WIRELESS SENSOR NETWORK PROTOCOL HAVING LINEAR CONFIGURATION

CLAIM FOR PRIORITY

This application claims priority to Korean Patent Application No. 10-2005-0126887 filed on 21 Dec. 2005, in the Korean Intellectual Property Office (KIPO), the entire contents of which are hereby incorporated by reference.

BACKGROUND

1. Field of the Invention

The present invention relates in general to the field of a sensor network, and more specifically to a communication protocol between sensor nodes.

2. Description of the Related Art

A sensor network is a core technical infra configured to realize ubiquitous computing technology and may be operated by wire or wireless connection. Since respective nodes in the sensor network, especially in wireless networks, use a limited capacity of battery, a main problem of the sensor network is to transmit sensing data using the minimum energy. Further, network latency must be reduced to the minimum in a large sensor network for the purpose of applying the sensor network to a real-time emergency service. Accordingly, the sensor network necessary for real-time monitoring requires a protocol with a very low network latency or delay while minimizing battery consumption.

A node of a wireless sensor network is operated by using a battery for a sensing operation, a computing operation. Problems such as pack collision, overhearing, control packet overhead, idle listening and the like, which energy is wasted in a wireless network, are arisen in case that a conventional MAC protocol such as an existing MANET and IEEE802.11 is applied to the sensor network. Specifically, the idle listening consumes most of energy, according as a sensor node is always operated in active state even in an interval of which a communication function is not required. In order to avoid above disadvantage, the conventional MAC protocol used in the sensor network reduce energy consumption by being operated in an active state by being awakened periodically while being ordinarily operated in a sleep state. As an example of such conventional MAC protocol, a sensor MAC protocol is described as follows.

<Sensor-MAC (S-MAC)>

The S-MAC protocol converts periodically a sensor node into a sleeping mode with a low duty cycle so as to reduce idle listening, a main cause of the energy consumption in the wireless network. This operation may reduce energy consumption as a main problem of the sensor network, get extensibility and avoid a packet collision, using competition-based scheduling. However, it has a disadvantage of increasing network latency due to the idle listening.

<Timeout-MAC (T-MAC)>

The T-MAC is a MAC protocol for a wireless sensor network based on competition such as the S-MAC. The T-MAC also reduces energy consumption by applying an active/sleep duty cycle proposed in the S-MAC. However, according as the duty cycle proposed in the S-MAC is applied in a fixed form, the efficiency of energy saving is reduced due to a change of traffic environment. In order to improve the disadvantage, the T-MAC is made to flexibly operate an active period according to data traffic. The T-MAC may increase the efficiency of energy saving due to the change of traffic environment by reducing idle listening less and less. However, similarly to the S-MAC, a problem of increasing network latency is still remained due to the idle listening.

<B-MAC>

The B-MAC is a MAC protocol basically based on CSMA. The MAC protocol uses a low power listening (LPL) for reducing idle listening to the minimum. A node configured to periodically perform listening for a very short time using the LPL and transmit data with packet having a preamble longer than the interval. When the preamble is recognized in an interval of the LPL, the node receives the following data. The B-MAC also generates a lot of energy consumption.

The above disadvantages of the conventional MAC protocol can be summarized as follows.

<Aspect of Energy Efficiency>

The S-MAC using the fixed duty cycle is successful in an aspect of general energy efficiency in comparison with the other conventional wireless MAC protocol. However, the energy efficiency of the S-MAC is greatly decreased in case of the node senses a very small volume of data in the sensor network, because of an unnecessary idle listening. In order to improve the disadvantage in the S-MAC, the T-MAC selects a method for saving energy by operating a timer, in case that a traffic environment of a network is lowered, by using a flexible duty cycle and reducing a unnecessary idle listening time, but consumes energy as much as the time wasted for setting a separate timer. And since the above duty cycle can not be adopted in an environment that a volume of network traffic is very high, it is difficult to effectively obtain an effect of energy saving.

The S-MAC or the T-MAC and B-MAC additionally consumes energy for transmitting or receiving a control packet or a long preamble except that energy is basically consumed to transmit data, and also consumes energy through idle listening for a specific interval depending on the traffic environment. Additionally, the S-MAC and the T-MAC generate additional energy consumption by using a CSMA-CA type, and the B-MAC additionally generates energy consumption due to overhearing.

<Aspect of Network Latency>

An existing MAC protocol for sensor network has a very big disadvantage in network latency. In case that a duty cycle is decreased to increase the energy efficiency of the S-MAC, the T-MAC and the B-MAC as protocols for sensor network, the network latency is increased in proportion thereto. In other words, in the existing conventional protocols, the energy consumption is remained to be inversely proportional to the network latency. This arises a severe problem in case that a real-time application is needed while using the limited power supply such as the battery. Specifically, the network latency is seriously affected in case that the sensor networks are in large scale.

<Problem of High Priority Packet Processing>

In order to use the wireless sensor network in emergency situation monitoring, the sensed data are required to be transmitted according to high priority. In other words, when data to be transmitted are in case of emergency, the emergency data must be given priority to non-emergency data. As such, a transmission chance must be given to a node having a higher priority. However, the above-described conventional communication type does not show a method for giving a priority in transmission.

<Aspect of Reliability>

The reliability has become a very important requirement while a technology of a sensor network is advanced to application stages. Specifically, in case that the technology of the sensor network is applied to emergency situation monitoring, the reliability becomes the most important issue. The existing conventional sensor network protocol just has considered reliability as a transmission issue. However, in order to assure the reliability, it is also needed to monitor the sensor nodes are in an error or are not operated.

SUMMARY

Accordingly, the present invention is provided to substantially obviate one or more problems due to limitations and disadvantages of the related art.

Example embodiments of the present invention provide a protocol for a sensor network configured to have very low network delay by synchronizing between nodes on the basis of a low power communication for operating periodically at sleep/active state.

Example embodiments of the present invention also provide a protocol for a low power sensor network by minimizing an idle listening time of an active interval at a periodical operation of a sleep/active state.

Example embodiments of the present invention also provide a communication protocol having a linear network configuration.

In some example embodiments, the configuration method of a sensor network configured to sense and collect data from a plurality of sensors includes: arranging linearly a communication path of each node so as to enable all sensor nodes except for a sink node and a terminal node to respectively have a predecessor and a successor; and fixing time synchronization of a whole network by enabling each of the nodes included in the sensor network to fix its own time synchronization based on an operation section of its own predecessor.

In other example embodiments, a data transmission method of a sensor network configured to collect detecting data from a plurality of sensors and of which respective node has a communication path of a serially linear structure includes: a) enabling an arbitrary node in the sensor network to synchronize its own operation interval according to an operation interval of its own predecessor; b) enabling an arbitrary node in the sensor network to receive data transmitted from its own successor in its own receipt interval; c) enabling the arbitrary node to confirm that the transmitted data are normal; and d) enabling the arbitrary node to transmit the data to its own predecessor in its own transmission interval in case that the data are normal.

In still other example embodiments, a new node joining method of a sensor network configured to collect detecting data from a plurality of sensors and of which respective node has a communication path of a serially linear structure includes: communicating a hello message configured to enable a terminal node located in the endmost position of the linear sensor network to periodically notify its own presence; enabling one or more sensor nodes configured to be newly joined to the sensor network to compute a link connection quality from a signal state of the hello message received to its own; enabling the sensor node having the highest link connection quality to communicate a preemptive message; enabling the sensor node to transmit a join message to the present terminal node in a next interval after communicating the preemptive message; and enabling the sensor node to advertise that the node becomes a new terminal node in case of receiving an ACK message corresponding to the join message.

In other example embodiments, an inter-node communication path rearranging method of a sensor network configured to collect detecting data from a plurality of sensors and of which respective node has a communication path of a serially linear structure, the respective node having its specific network ID and a fewer ID value in inversely proportion to a predecessor includes: enabling an arbitrary node which does not receive an ACK signal after being transmitted from its own predecessor to be converted into a receipt standby state; enabling the receipt standby conversion node to transmit a join message to its own and a node which has a low ID value and the fewest difference among neighboring nodes; setting a node configured to transmit a response message as its own predecessor, when the receipt standby conversion node receives the response message corresponding to the join message.

Further, a sensor node configured in order to perform the methods according to the above-described present invention, may include a high priority buffer configured to temporarily store emergency data, a low priority buffer configured to temporarily general data, wherein in case that a transmission packet is generated, the temporarily stored emergency data are first included in the high priority buffer, and in case that there's a redundant in a data field of the transmission packet, the general data temporarily stored in the low priority buffer are included in the transmission packet.

BRIEF DESCRIPTION OF THE DRAWINGS

Example embodiments of the present invention will become more apparent by describing in detail example embodiments of the present invention with reference to the accompanying drawings, in which:

FIG. 1 is a conceptual view illustrating the structure of a variance TDMA according to the present invention;

FIG. 2 is a timing view illustrating time synchronization according to the present invention;

FIG. 3 is a conceptual view illustrating a time synchronized forwarding mechanism according to the present invention;

FIG. 4 is a view for explaining a virtual communication line configuration processing according to the present invention;

FIG. 5 is a view for explaining a virtual communication line reconfiguration processing according to the present invention;

FIG. 6 is a sample view illustrating the structure of a data packet according to the present invention;

FIG. 7 is a view illustrating the structure of a buffer for processing a priority according to the present invention.

DESCRIPTION OF EXAMPLE EMBODIMENTS OF THE PRESENT INVENTION

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

Hereinafter, preferred embodiments of the present invention will be described in detail with reference to the accompanying drawings. The embodiment will be explained in detail for enabling people who have common intellects in a corresponding field to execute the present invention.

<Real-Time Wireless Sensor Network Protocol (R-WSLP) Having Linear Structure>

A basic characteristic of the present invention is that a network is linearly formed. Hereinafter, a real-time wireless sensor network protocol is referred as R-WSLP according to the present invention.

According to the preferred embodiment of the present invention, the real-time wireless sensor network protocol technology is provided so as to assure low voltage and very low network latency in a large sensor network application environments, and developed for applications necessary for reporting an emergency in real time in application fields of the sensor network. Specifically, fields of forest fire monitoring, safe monitoring such as railroads, roads and bridges and secure facility monitoring such as national defense, specific areas and buildings are very important to real-time characteristic and the technology may be effectively applied.

The sensor network protocol reduces energy consumption to the minimum and secures the real-time characteristic of network by satisfying requirements of the detect data transmitting in real time, an efficient operation in a large linear sensing field, low voltage consumption, overhearing removal, minimization of control packet overhead, using a low duty cycle MAC algorithm and a time synchronized forwarding mechanism based on a distributed TDMA. Further, a control overhead is minimized by the integration of a link layer, a network layer and a transport layer by simplifying a layer concept of the existing communication protocol. Additionally, the extensibility is provided through a self-organization function configured to automatically form a virtual sensor line.

<Distributed TDMA>

The R-WSLP uses a distributed TDMA technology so as to have low network latency while assuring a low duty cycle for low voltage. The distributed TDMA, differently from the existing TDMA, enables respective node to allocate its own time slot based on its own predecessor without enabling a master node located in the network to allocate time slots of all nodes.

FIG. 1 is a view illustrating the communication flow of respective linearly arranged node based on distributed TDMA.

As illustrated in FIG. 1, the respective node is divided into an active period and an inactive period, the active period performs data receipt, data transmission and ACK receipt according to an order of RX-TX-ACK. Data are transmitted/received by synchronizing TX of a transmission node with RX of a receipt node through time synchronization between nodes to be transmitted/received. A time synchronization of a whole network is really performed by time synchronization between two nodes configured to transmit/receive data. In other words, all nodes of network perform distributedly a synchronization operation on the whole network through time synchronization with a node which transmits and receives data to/from itself, and mutual collision between nodes is avoided on the basis of the synchronization.

FIG. 2 is a view illustrating a method that synchronization in the network is performed in R-WSLP according to the present invention.

Considering to a point of view of whole network, a Collision Resolution Interval (CRP) of which nodes in the network take part in communication while avoiding mutual collision and an Inter-CRP of which the nodes do not use a communication channel used by the network are existed. In order to avoid collision between nodes in the R-WSLP, the ICRP in sub-network composed of nodes in a RF range on the basis of a RF range of respective node is certainly set larger than the CRP.

Respective node performs time synchronization with its own predecessor in order for TDMA communication. The accuracy of time synchronization in the R-WSLP has an effect on network latency and power consumption. A time synchronization technology used in the R-WSLP sets a Timer_A configured to take charge of a periodical Wakeup on the basis of a captured time stamp using a Start of Frame Delimiter (SFD) existed in a packed sent from the higher node and performs RX-Data, TX-Data and RX-Ack of its own using a Timer_B in case that the Timer_A is terminated after a predetermined time. Respective node prevents a phenomenon of drifting a visual angle by resetting its own Timer_A whenever the respective node receives SFD at every interval of RX-Ack. Further, a guard time is sufficiently provided in transmission and receipt so as to prevent the time synchronization from being broken by a jitter.

<Time Synchronized Forwarding Mechanism for Low Latency and Low Voltage Consumption>

A time synchronized forwarding mechanism, i.e., one of the characteristics of the present invention achieves low latency and low voltage consumption on the basis of the distributed TDMA. All nodes of network are operated by the distributed TDMA on the basis of information of a sink node. In other words, all nodes periodically repeat sleep and wakeup at the same a interval as the sink node. The interval is time-synchronized with the very higher node so as to forwarding data toward the sink node. FIG. 3 illustrates a basic concept of the time-synchronized forwarding mechanism.

Node 1 performs time synchronization with a sink node as its own predecessor and determines its own wakeup interval using a wakeup interval of the higher node. The next Node 2 of Node 1 performs time synchronization with Node 1 and inherits the same wakeup interval. Similarly, next nodes perform time synchronization with its own predecessor and inherit the same wakeup interval. The time-synchronized nodes are operated according to an order of RX-TX-ACK. A procedure of forwarding on the basis of Node 2 is as follows. Node 2 receives a message from Node 3 during its own RX interval. The Node 2 which receives the message performs forwarding on messages to the Node 1 during a TX interval by including detect information acquired by itself and information forwarded from Node 3 in a TX message. The Node 1 which receives the message checks whether the message is useful using FCS and performs forwarding to the sink node by making a message using detect information acquired by itself and data received from the Node 2, when the message is normally received. At this time, the Node 1 includes ACK information which data have been normally received from the Node 2, in its own message by a Piggyback type. The Node 2 hears the message transmitted from the Node 1 to the sink node for its own PCK interval. When the ACK information is existed in the message received from the Node 1 during ACK interval, the Node 2 judges that the message has been successfully forwarded to the Node 1 and deletes information which is hold in a buffer for retransmission in case of transmission error. The time-synchronized forwarding mechanism may largely reduce the latency of which information collected from the detect node in an environment of a low duty cycle is reached to the sink node.

The network latency between the Node 3 and the sink node is RXNode3+RXNode2_RXNode1+RXSink. In other words, the network latency in R-WSLP is a value of multiplying RX time by the number of transmission hop without regard to the duty cycle.

<Virtual Line Arrangement Mechanism>

In the R-WSLP, a linear topology is basically adopted. The linear topology has a predecessor and a successor one by one, except for the sink node and the terminal node. A method for efficiently constituting the linear topology will now be explained with reference to FIG. 4 according to the present invention. FIG. 4 illustrates a process of virtual line arrangement mechanism.

The described wireless sensor nodes must constitute a virtual line so as to be identified with a physical location. In other words, when physically neighboring nodes have to become a predecessor and a successor in a virtual line, the efficient topology is formed. A node configured to collect data in the virtual line is referred as a sink node, and a final node of the line is referred as a terminal node. In this case, first, the sink node becomes the terminal node and the terminal node may become a node most recently joined to network while forming the virtual line. The terminal node periodically informs the successor that the node is the terminal node using the message while transmitting a hello message or data to the predecessor. When various nodes exist around the terminal node, a Link Quality Indication (LQI) is used as a method for measuring physical distance, so as to enable the virtual line to be identified with the physical line so far as possible by joining from the most physically adjacent node in order. When newly joined nodes hear the hello message or the data message of the present terminal node while staying in a standby state, the nodes obtain LQI using a Received Signal Strength Indicator (RSSI) and a Signal-to-noise-ratio (S/N ratio) of the message received from the terminal node. The nodes preempt an authority of join by enabling the node having the best LQI on the basis of measured values to transmit preemption messages to neighboring nodes. The node which has transmitted the preemption message transmits a join message in the very next interval and advertises that the self is a new terminal node in case of receiving the ACK. The neighboring nodes of receiving the preemption message are limited to trial to be joined in the very next wakeup interval.

New nodes that desire to be joined to the network, is standing by RX On state in order to search whether a terminal node is existed around the new node. In this case, when the terminal node receives a message, the new nodes perform the time synchronization and measure the LQI. The nodes, which have received the message from the terminal, transmit preemption messages on the basis of the measured LQI. The node having a good value of LQI is controlled to transmit the preemption message, and nodes having similar values avoid collision through Random Backoff. An exemplary method of enabling an arbitrary node to confirm whether its own LQI is the best is to enable respective join hope node to communicate a message including LQI value calculated by itself and compare the LQI received to itself with the LQI calculated by itself. The neighboring nodes, which receive the preemption message, delay a join process till a very next interval. The series of processes enable the terminal node and a node having the judged best LQI to be firstly joined among the nodes to be joined. In other words, the virtual line arrangement is performed through the process. To limit a start of a section capable of enabling a node to transmit the preemption to a point after T/2 is to avoid collision by transmitting the message to CRP section of the predecessors of the terminal node after T/2.

The nodes set its own network ID to a value one larger than a network ID of the predecessor. The value is maintained till the network is reset.

<Virtual Line Rearrangement Mechanism>

A virtual line rearrangement mechanism for self-healing of the sensor network uses a method of autonomously connecting with the predecessor so as to reconstruct the virtual line in case that the predecessor is malfunctioned or not communicated in a direction of the sink node.

FIG. 5 is illustrates a virtual line rearrangement mechanism.

When Node 4 does not receive an ACK message from Node 3 more than 3 times, Node 4 is changed into a RX On state and joined with the predecessor in a process similar to the virtual line arrangement mechanism. At this time, when the Node 2 grasps a problem of Node 3 as its own successor, the Node 2 may rearrange a path on the basis of the above-described virtual line arrangement mechanism by recognizing itself as the terminal node and broadcasting a hello message. Or, when Node 2 doesn't recognize the problem of the Node 3, since the Node 2 does not communicate the hello message, the Node 4 may perform rearrangement by setting the Node 2 as its own predecessor, when the receipt standby conversion node transmits a join message to a destination a node (i.e., node 2) having a lower ID value and the fewest difference between the ID value among its own neighboring nodes, and receives a response message corresponding to the join message from the Node 2.

Node 4 forms a new virtual line by trying to be connected with a node having the network ID lower than itself and the fewest difference of the ID among the recognized nodes as the neighboring nodes. Change of the network ID is not existed in a process of rearrangement.

<Data Transmission of High Reliability>

The R-WSLP provides a function of virtual line rearrangement mechanism for error generation node monitoring and network self healing using a Piggyback acknowledgement method, in order to reliably transmit data and assure the reliability of the network.

First, the Piggyback acknowledgement method includes and transmits an ACK corresponding to a direction opposite to a message for transmitting data in a sync direction. In other words, there is no need for keeping a special control message for the ACK by playing a role as a data message in a sync direction and an ACK message in a terminal direction by transmitting one message. The successor performs a retransmission in a next period, when the ACK is not received. Also, for the purpose of monitoring an error generation mode, when the message is not received from the successor connected to its own in the next period, an error is reported to the sink node using a network ID of the error node. A server performs a monitoring on the node of which the error is generated in real time and the monitoring information is stored in a database.

<Date Aggregation Transmission>

In R-WSLP, a transmission method through data aggregation is used. A method for transmitting sensor data of a number of bytes one by one by packet requires very much computing and processing time to a system as wall as overhead generated by a header of the packet. In R-WSLP, this problem has been solved using the method of data aggregation.

FIG. 6 illustrates the construction of a packet for data aggregation.

A payload in R-WSLP packet is composed of groups of sub-payload. The sub-payload is composed of a source ID which data informs an ID of a collected node, a data-type field which indicates a type of sensing data, and a data field which loads real data. Specifically, the data-type field performs the segmenting for emergency data and for whether the data-type field is 1 byte or 2 bytes, including monitoring and indicating a control packet.

<Emergency Data Priority Transmission Policy Through Packet Priority>

The R-WSLP is designed for an environment of which low data traffic is generated. However, a great volume of network traffic is instantaneously generated in a specific condition. In this condition, the priority can be given to the data so as to assure priority transmission of emergency data.

Respective sensor node has two ring buffers, i.e., a high priority buffer and a low priority buffer, indicates data received from the successor and data obtained from its own sensor to the data type field according to priority, and records the indicated data to a buffer of a corresponding priority. In a size of maximum transmission unit (MTU) capable of being transmitted to a payload of a corresponding interval for data transmission, the sub-payload is firstly brought from the high priority buffer, and the sub-payload having the low priority is loaded and transmitted to the redundant spaces.

As described above, according to the example embodiment of the present invention, the real-time sensor line protocol may reliably transmit data with low transmission latency while reducing power consumption of respective node, and process the transmission of emergency data requiring to be quickly processed.

While the example embodiments of the present invention and their advantages have been described in detail, it should be understood that various changes, substitutions and alterations may be made herein without departing from the scope of the invention.

What is claimed is:

1. A method comprising:

forming a linear sensor network by arranging a sink sensor node, a plurality of sensor nodes, and a terminal sensor node serially along a path, wherein each sensor node has a single predecessor sensor node and a single successor sensor node along the path, the sink sensor node being at the beginning of the linear sensor network, the terminal sensor node being at the end of the linear sensor network, and the plurality of sensor nodes being between the sink sensor node and the terminal sensor node;

synchronizing an operational interval of respective sensor nodes based on operational intervals of corresponding single predecessor sensor nodes starting with a first sensor node beyond the sink sensor node, each operational interval having reception, transmission, and acknowledgment intervals in that order, such that a transmit interval of a sensor node corresponds to a reception interval of a single predecessor sensor node and an acknowledgement interval of a single successor sensor node, and such that the operational interval of a successor sensor node starts before the operation interval of a predecessor sensor node and ends before the operational interval of the predecessor sensor node ends in order to provide time staggered operational intervals from the terminal sensor node to the sink sensor node, wherein the first sensor node beyond the sink sensor node synchronizes with the sink sensor node and successive sensor nodes synchronize thereafter;

receiving at an arbitrary sensor node in the linear sensor network data transmitted from a corresponding single successor sensor node during a reception interval of the arbitrary sensor node;

confirming at the arbitrary sensor node whether the received data are normal; and transmitting the data from the arbitrary sensor node to a corresponding single predecessor sensor node during a transmission interval of the arbitrary sensor node, when the data are confirmed to be normal.

2. The method of claim 1, wherein transmitting further comprises:

generating a transmission packet including the data received from the corresponding single successor sensor node and/or data detected by the arbitrary sensor node;

inserting an acknowledgement (ACK) signal into the transmission packet, wherein the ACK signal indicates that the data was received from the corresponding single successor sensor node; and transmitting the transmission packet to the corresponding single predecessor sensor node and the corresponding single successor sensor node simultaneously.

3. The method of claim 2, further comprising:

retransmitting the transmission packet by the arbitrary sensor node in a next transmission interval when the transmission packet is not received by the corresponding single predecessor sensor node; and deleting data transmitted in the transmission packet buffered by the arbitrary sensor node when said transmission packet is received by the corresponding single predecessor sensor node.

4. The method of claim 2, wherein the transmission packet includes data grouped into sub-payloads, each sub-payload comprising an identifier of a node which detected the data in the sub-payload, a data type identifier which represents a data type of the data in the sub-payload, and the detected data.

5. A method comprising:

forming a linear sensor network by arranging a sink sensor node, a plurality of sensor nodes, and a terminal sensor node serially along a path, wherein each non-endpoint node has a single predecessor sensor node and a single successor sensor node along the path, the sink sensor node being at the beginning of the linear sensor network, the terminal sensor node being at the end of the linear sensor network, and the plurality of sensor nodes being between the sink sensor node and the terminal sensor node;

broadcasting periodically a hello message from the terminal sensor node;

calculating at each of one or more new sensor nodes which are configured to join the linear sensor network a link quality indication (LQI) from a received hello message;

determining which of the one or more new sensor nodes has the highest LQI;

transmitting a preemption message from the new sensor node having the highest determined LQI to delay remaining new sensors from joining the linear sensor network;

transmitting a join message from the new sensor node to the terminal sensor node during a next wakeup interval; and advertising that the new sensor node has become a new terminal sensor node, when the new sensor node receives an acknowledgement message corresponding to the join message.

6. The method of claim 5, further comprising:

determining which of the one or more new sensor nodes has the second highest LQI; and transmitting a preemption message from the new sensor node having the second highest LQI during a subsequent transmission interval to delay remaining new sensor nodes from joining the linear sensor network.

7. A method comprising:
  forming a linear sensor network by arranging a plurality of sensor nodes serially along a path, wherein each non-endpoint sensor node has a single predecessor sensor node and a single successor sensor node;
  setting by each sensor node its own network identifier (ID) configured to indicate an order of the plurality sensor nodes along the path, wherein each sensor node sets its network ID to a value that is higher than a network ID of a single predecessor sensor node such that sensor nodes with lower network IDs are closer to a sink sensor node;
  initiating a process for rearranging the linear sensor network when the arbitrary sensor node does not receive an acknowledgement to a message previously transmitted to a corresponding single predecessor sensor node by transmitting a join message from the arbitrary sensor node to a sensor node having lower network ID and a smallest difference in network IDs; and
  completing the process for rearranging the linear sensor network by setting the sensor node having the lower network ID and the smallest difference in network IDs to the single predecessor sensor node of the arbitrary sensor node, when the arbitrary sensor node receives a response message corresponding to the join message.

8. A method comprising:
  forming a linear sensor network by physically arranging a sink sensor node, a plurality of sensor nodes, and a terminal sensor node serially along a path, wherein each of the plurality of sensor nodes has a single predecessor sensor node and a single successor sensor node along the path, the sink sensor node has a single successor sensor node, the terminal sensor node has a single predecessor sensor node, and the plurality of sensor nodes being between the sink sensor node and the terminal sensor node; and
  synchronizing linear sensor network time with the sink sensor node, wherein each sensor node in the linear sensor network synchronizes its operational interval with an operational interval of its single predecessor sensor node.

9. A sensor node configured to perform a method as described in one of claim 1 or claim 8 comprising:
  a high priority buffer configured to temporarily store emergency data; and
  a low priority buffer configured to temporarily store general data;
  wherein when a transmission packet is generated, the emergency data temporarily stored in the high priority buffer are included firstly in the transmission packet, and when space remains in a data field of the transmission packet, the general data temporarily stored in the low priority buffer are included in the transmission packet.

10. The method of claim 8, wherein synchronizing further comprises synchronizing an operational interval of respective sensor nodes based on operational intervals of corresponding single predecessor sensor nodes starting with a first sensor node beyond the sink sensor node, each operational interval having, reception, transmission, and acknowledgment intervals, such that a transmit interval of a sensor node corresponds to a reception interval of a single predecessor sensor node and an acknowledgement interval of a single successor sensor node, and such that the operational interval of a successor sensor node starts before the operation interval of a predecessor sensor node and ends before the operational interval of the predecessor sensor node ends in order to provide time staggered operational intervals from the terminal sensor node to the sink sensor node, wherein the first sensor node beyond the sink sensor node synchronizes with the sink sensor node and successive sensor nodes synchronize thereafter.

11. The method of claim 10, wherein transmission and reception intervals are allocated according to distributed time division multiple access (DTDMA), wherein each sensor node allocates its TDMA time slot based on a predecessor sensor node's time slot.

12. The method of claim 8, wherein the path comprises a virtual sensor line, and the plurality of sensor nodes are arranged in the virtual sensor line according to a ranking of a unique identifier assigned to each sensor node, and wherein each sensor node can assign its own unique identifier.

13. The method of claim 8, wherein the path comprises a virtual sensor line, and the plurality of sensor nodes are arranged in the virtual sensor line according to a link quality indicator (LQI), and wherein two neighboring sensor nodes with the highest LQIs are selected as single predecessor and single successor sensor nodes respectively.

14. The method of claim 9, wherein synchronizing comprises synchronizing each sensor node in the linear sensor network based on a captured timestamp received from its single predecessor sensor node.

15. The method of claim 14, wherein the captured time stamp is received during an acknowledgement interval of a respective sensor node during a transmission interval of the respective sensor node's single predecessor sensor node.

16. The method of claim 14, wherein the captured time stamp is captured from a Start of Frame Delimiter field in a received packet.

\* \* \* \* \*